US006680104B2

(12) United States Patent
Boris et al.

(10) Patent No.: US 6,680,104 B2
(45) Date of Patent: *Jan. 20, 2004

(54) WRAPPABLE DECORATIVE FILM

(75) Inventors: Gregory J. Boris, Swarthmore, PA (US); Frank M. Yandrisevits, III, Princeton, NJ (US)

(73) Assignee: Leonard Kurz GmbH & Co., Fürth (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 29 days.

(21) Appl. No.: 09/049,372

(22) Filed: Mar. 27, 1998

(65) Prior Publication Data

US 2002/0098328 A1 Jul. 25, 2002

(51) Int. Cl.[7] ........................ B32B 23/08; B32B 27/08; B32B 27/20; B32B 27/30; B32B 27/36

(52) U.S. Cl. ...................... 428/201; 428/332; 428/336; 428/480; 428/481; 428/483; 428/522; 428/532; 428/542.2; 428/542.6; 428/910; 428/914

(58) Field of Search ................................ 428/151, 480, 428/483, 481, 542.2, 542.6, 910, 914, 332, 41.5, 41.6, 41.7, 42.1, 201, 336, 522, 532

(56) References Cited

U.S. PATENT DOCUMENTS

| | | | | | |
|---|---|---|---|---|---|
| 3,322,605 | A | | 5/1967 | Frech | 428/202 |
| 3,494,818 | A | | 2/1970 | Marchese | 428/187 |
| 3,666,516 | A | | 5/1972 | Dunning | 428/162 |
| 3,770,479 | A | | 11/1973 | Dunning | 428/151 |
| 3,953,635 | A | | 4/1976 | Dunning | 428/151 |
| 4,011,078 | A | * | 3/1977 | Honjo et al. | 96/1 R |
| 4,211,809 | A | | 7/1980 | Barta | 428/201 |
| 4,211,810 | A | | 7/1980 | Barta | 428/201 |
| 4,717,615 | A | | 1/1988 | Reinhart | 428/161 |
| 4,743,509 | A | | 5/1988 | Vladimiro | 428/425.1 |
| 4,837,072 | A | | 6/1989 | Kraetschmer | 428/201 |
| 4,948,654 | A | | 8/1990 | Brooks et al. | 428/201 |
| 5,215,826 | A | | 6/1993 | Shimanski et al. | 428/483 |
| 5,413,840 | A | | 5/1995 | Mizuno | 428/195 |
| 5,503,905 | A | | 4/1996 | Boris | 428/195 |
| 5,658,847 | A | * | 8/1997 | Goss et al. | 503/227 |
| 5,665,475 | A | | 9/1997 | Süssner | 428/488.4 |
| 5,721,086 | A | * | 2/1998 | Emslander et al. | 430/126 |
| 5,773,112 | A | * | 6/1998 | Tachikawa et al. | 428/40.1 |
| 5,871,829 | A | * | 2/1999 | Nishizawa et al. | 428/40.1 |
| 5,919,866 | A | * | 7/1999 | Rao et al. | 525/276 |
| 5,977,263 | A | * | 11/1999 | Phillips | 525/329.9 |
| 6,001,482 | A | * | 12/1999 | Anderson et al. | 428/409 |
| 6,153,289 | A | * | 11/2000 | Murray | 428/201 |

FOREIGN PATENT DOCUMENTS

| | | |
|---|---|---|
| DE | 44 46 255 A1 | 6/1996 |
| EP | 0 230 364 A2 | 7/1987 |
| WO | WO 92/11139 | 7/1992 |

OTHER PUBLICATIONS

DuPont Teijin Melinex films product literature, Sep. 2001.*
Encyclopedia of Polymer Science and Engineeering, vol. 10, pp. 613–616, Mar. 1988.*
Encyclopedia of Polymer Science and Engineering, vol. 1, pp. 472–475, Aug. 1985.*

* cited by examiner

*Primary Examiner*—Ramsey Zacharia
(74) *Attorney, Agent, or Firm*—Akin Gump Strauss Hauer & Feld, L.L.P.

(57) ABSTRACT

A decorative wrapping film for application to a three-dimensional substrate includes a biaxially-oriented polyester layer which has a first surface for adhering to a three-dimensional substrate and a second surface. A decorative layer is coated on the second surface of the polyester layer, and a protective layer is coated on the decorative layer.

16 Claims, 1 Drawing Sheet

WRAPPABLE DECORATIVE FILM

BACKGROUND OF THE INVENTION

Decorative films, such as simulated wood films, are used for providing a pattern, such as the appearance of real wood grain, to many surfaces including furniture, countertops, walls, siding and the like.

U.S. Pat. Nos. 3,666,516, 3,770,479 and 3,953,635 by Dunning teach heat-stamped simulated wood-grain films. Further such simulated films may be found in U.S. Pat. No. 5,503,905 of Gregory Boris. Many such films are useful on flat or generally flat surfaces to provide an outer-layer laminate which has the look and appearance of real wood or to provide a decorative pattern to a substrate such as fiberboard, particle board and the like.

Most films of this nature are formed of two general constructions. The film may be formed from the bottom layer, intended for adhesion to the substrate surface, up to the top layer. An adhesive layer may be formed on a easily removable backing support sheet, followed by a base coat, design layers and a protective top layer and/or carrier sheet. In such a construction, the film is applied to the substrate by removing the backing support sheet and applying heat and/or pressure to the upper surface of the film, typically on the carrier sheet, to activate the adhesive and adhere it to the substrate surface. The carrier sheet is then removed from the film. Alternatively, as described in U.S. Pat. No. 5,503,905, such a film may be formed in the reverse order, i.e., from the top layer of the film down to the base, by applying the protective layer, top coat, design layers, base coat and adhesive layer to the carrier film. Such films are applied by contacting the adhesive layer with the substrate surface and applying heat and/or pressure to the film to activate the adhesive and adhere the film to the substrate. The carrier is then removed from the upper surface of the film. The carriers used in prior art decorative films are typically formed of polyester, polyolefin or cellophane and are intended to be easily removed from the decorative layers, in some instances, with use of an additional release layer between the carrier and the top of the decorative layers.

While many films are available for use on generally flat surfaces, these decorative films are difficult to apply, and do not always adhere well, maintain their structural integrity or form a smooth and defect-free appearance when used on three-dimensional surfaces, e.g., on wood trim having a routed carving or on the edges of tables having carved designs. Further, prior art films are typically not thermally stable and tend to shrink during processing. They are also not generally very durable.

Some heat molding films have been developed for providing a color coating to three-dimensional automotive body parts such as thermoplastic automobile panels and bumpers in the form of a laminate, as in U.S. Pat. No. 4,948,654 of Brooks. This patent teaches a polyetherester or copolyester carrier sheet which is coextruded or otherwise molded to an curved article such as an automobile bumper. The film is positioned in the mold for the article and a molten fluid capable of hardening into the shape of the article and to the film is injected in the mold.

U.S. Pat. No. 5,413,840 includes a laminated film for decorating medium-density fiberboard which has a polyvinyl chloride base film laminated by adhesive layer to a polyester film which is further laminated to a hard coat and protective layer. The film is formed to allow V-cut processing to form a notch for bending the film around a corner of a piece of fiberboard.

While the prior art films may be suitable for use on corners or in molding applications, there is a need in the art for a film which can be easily and smoothly adhered to a three-dimensional article without surface defects and which is also scratch resistant and durable. There is further a need in the art for a thermally stable film which does not exhibit significant shrinkage during processing.

BRIEF SUMMARY OF THE INVENTION

The invention includes a decorative wrapping film for application to a three-dimensional substrate, comprising a biaxially-oriented polyester layer having a first surface for adhering to a three-dimensional substrate and a second surface; a decorative layer coated on the second surface of the polyester layer; and a protective layer coated on the decorative layer.

In one embodiment, the invention includes decorative wrapping film for application to a three-dimensional substrate, comprising a biaxially-oriented polyester layer having a first surface for adhering to a three-dimensional substrate and a second surface, wherein the biaxially-oriented polyester comprises a polyalkylene terephthalate selected from the group consisting of a polybutylene terephthalate and a polyethylene terephthalate and the polyester layer has a thickness of from about 50 to about 700 gauge (about 13 to about 178 microns); and a decorative layer coated on the second surface of the polyester layer.

The invention also includes a method for making a three-dimensional wrapping film, which comprises coating a first surface of a biaxially-oriented polyester layer with a decorative layer, wherein a second surface of the polyester layer opposite the surface coated with the decorative layer is capable of being applied to a three-dimensional substrate.

In one embodiment, the invention includes a method for coating a three-dimensional substrate, the method comprising adhering a decorative film at least partially around a three-dimensional substrate using an adhesive, wherein the film comprises a biaxially-oriented polyester layer having a first surface for adhering with the adhesive to the substrate and a second surface, and a decorative layer coated on the second surface of the polyester layer.

BRIEF DESCRIPTION OF THE SEVERAL VIEWS OF THE DRAWINGS

The foregoing summary, as well as the following detailed description of the preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings, like numerals are used to indicate like elements throughout. In the drawings.

DETAILED DESCRIPTION OF THE INVENTION

Figure 1:
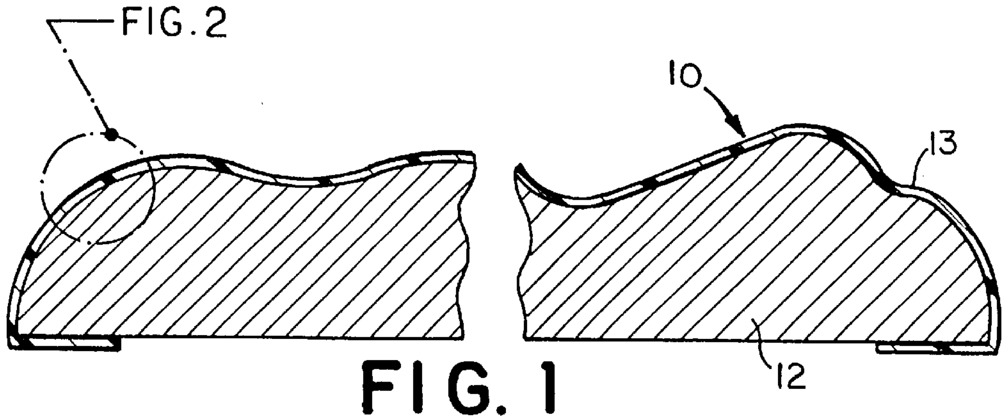
FIG. 1 is an enlarged, partially broken cross-sectional schematic representation of a decorative wrapping film according to one embodiment of the invention wrapped around a three-dimensional substrate.

Certain terminology is used in the following description for convenience only and is not limiting. The words "lower" and "upper" and "top" and "bottom" designate directions in the drawings to which reference is made. The terminology includes the words above specifically mentioned, derivatives thereof and words of similar import.

Figure 2:
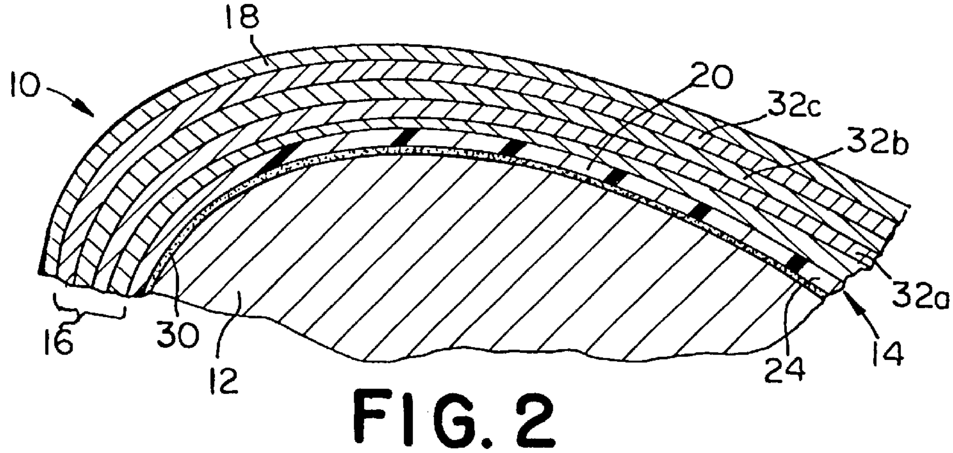
FIG. 2 is a greatly enlarged portion of the decorative wrapping film on the three-dimensional substrate of FIG. 1.

Referring now to the drawings in detail, there is shown in FIGS. 1 and 2 a decorative wrapping film, generally designated as 10, wrapped around an exemplary three-dimensional substrate 12. The substrate as shown has curved surfaces 13 such as those found, for example, in a piece of wood molding having a carved or routed pattern. The substrate 12 is intended to be for illustration purposes and it will be understood based on this disclosure, that other carved or shaped surfaces and other types of substrates may be used with the films of the present invention. Suitable substrates to which the film 10 may be applied include any surface capable of bonding to the film 10 of the present invention. Typical substrates 12 include, among others, wood, plastic, metal, fiberboard, medium-density fiberboard, ceramic and the like. It is understood by those skilled in the art, based on this disclosure, that other substrates 12 may be used without departing from the present invention. It should also be understood, based on this disclosure, that while the film 10 is capable of wrapping around a three-dimensional substrate, it may also be used on a substrate having a generally flat surface.

Figure 3:
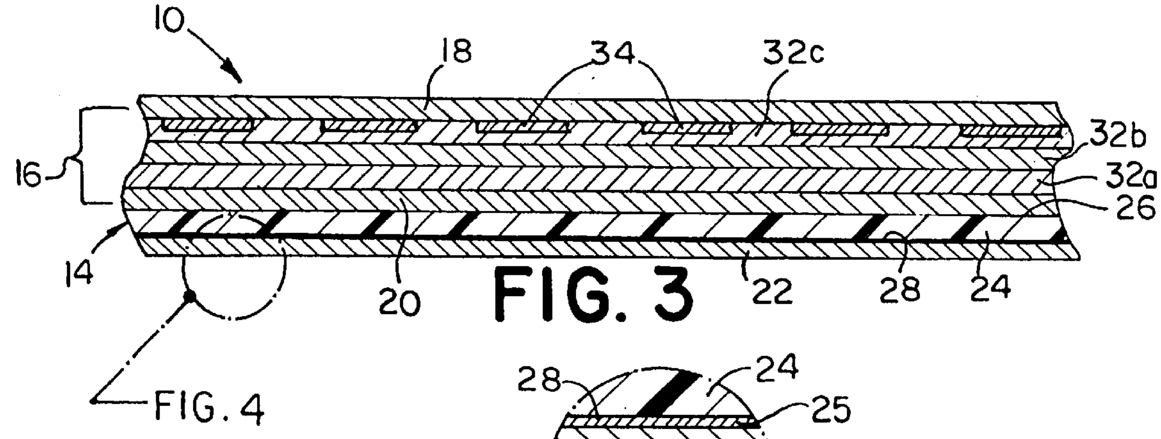
FIG. 3 is an enlarged cross-sectional view of a portion of an alternative embodiment of a decorative wrapping film according to the invention.

The basic structure of the film 10 beginning at the base and moving up through the film 10 will now be described with reference to the alternative embodiments of the film 10 shown in FIGS. 2 and 3. The basic differences between the film 10 as shown in FIG. 2 and as shown in FIG. 3 is that film 10 as shown in FIG. 3 includes an undercoating and an adhesion promoting treatment on the polyester layer 14 as well as decorative markings in the print layers as described in detail below. The basic structure as shown in FIGS. 2 and 3 includes a polyester layer 14, a decorative layer 16 and preferably a protective layer 18. The decorative layer 16 preferably includes one or more layers for providing a pattern or design to the film 10, however, the decorative layer 16 need not have a design and may be solid colored or transparent. The decorative layer 16 may also include a decorative base coat 20 at the bottom of the decorative layer 16 which provides a base to the design and can be used for enhancing adhesion to the polyester layer 14. As shown in FIG. 3, the film 10 may also include an optional undercoating layer 22 below the polyester layer 14.

The film 10 may be assembled by several different methods. In one method, the polyester layer 14, is coated with the layer of layers of the decorative layer 16 followed by optional application of a protective layer 18. If an undercoating layer 22 as shown in FIG. 3 is used, the undercoating may be applied first to one surface of the polyester layer 14, and the coated polyester layer reversed such that the opposite surface of the polyester layer 14 is coated with the layer or layers within the decorative layer 16 and optionally with the protective layer 18. Alternatively, the polyester layer 14 may be coated on one surface with the various layers of the decorative layer 16, and optionally the protective layer 18, and the coated polyester layer then reversed and coated on the opposite surface of the polyester layer 14 with an undercoating 22.

The above mentioned layers will now be described in greater detail beginning with the polyester layer 14 and/or undercoating 22 and moving upward through the film 10. The polyester layer 14 of FIGS. 2 and 3 includes a biaxially-oriented polyester. The biaxially-oriented polyester layer is sufficiently thermally stable such that when processing the film 10 and subjecting it to heat, the polyester does not lose registration with the remaining layers of the decorative film and resists shrinkage. In addition, the polyester layer 14 is very durable and conforms well to the three-dimensional substrate surface. Preferably, the biaxially-oriented polyester layer includes an aromatic linear polyester preferably formed by polycondensation of diacids and diols and their derivatives. Preferably, the diacids and/or diols include at least one aromatic compound having a benzene ring to provide an aromatic polymer. Suitable polyesters include polyalkylene terephthalates such as polymethylene terephthalate, polyethylene terephthalate, and polybutylene terephthalate. More preferably, the polyester layer 14 includes a biaxially oriented polybutylene terephthalate or, most preferably, a biaxially-oriented polyethylene terephthalate. The polyester layer 14 preferably includes polyester in the form of a sheet or film 24. Preferably, the polyester film 24 within the polyester layer 14 has a film thickness measured transversely in the smallest dimension of the polyester film 24 of from about 50 to 700 gauge (about 13 to 178 microns), and more preferably from about 90 to about 200 gauge (about 23 to about 51 microns).

Figure 4:
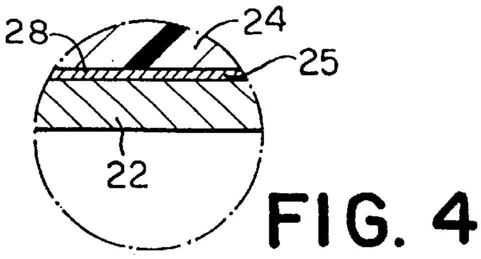
FIG. 4 is a greatly enlarged portion of an area of the decorative wrapping film of FIG. 3.

It is also preferred that the polyester layer 14, include an adhesion promoting treatment 25 on the upper 26 or lower 28 surface of the biaxially-oriented polyester film 24 in the polyester layer 14. By providing such an adhesion promoting treatment, the film will exhibit improved adhesion with respect to the adhesive used to attach the film 10 to the substrate 12 and/or attach the polyester film 24 to the decorative layer 16. While various adhesion promoting treatments known in the art may be used, it is preferred that the adhesion promoting treatment 25 be an aqueous-based acrylic material coated on the polyester film 24 of a thickness no greater than 1 micron, and preferably of sub-micron thickness which adheres well and/or chemically crosslinks to the polyester film 24. While FIGS. 3 and 4 show such a treatment 25 for only one surface 28 of the film for exemplary purposes, it is preferred that the biaxially-oriented polyester film 24 within the polyester layer 14 includes such an adhesion promoting treatment 25 on both surfaces 26, 28.

Suitable polyalkylene terephthalate films typically used for labeling or packaging may be used and/or pretreated with an adhesion promoting treatment. In addition, while a translucent, colored or matte polyester film may be used for certain applications, it is preferred that the polyester film 24 be transparent and that any color or pattern be provided by the decorative layer 16 and/or any undercoating 22. Without limitation to the scope of the invention, exemplary commercial polyester films 24 having suitable properties for use in the polyester layer 14 of the invention which is already pretreated with an adhesion promoting treatment on one or both sides include Melinex® 315, 331, 335, 453, 454, and 475 as well as Kaladex® K1030 and K2030 which are available from E.I. DuPont de Nemours and Company or ICI Americas. Most preferred is Melinex® 454. However, it should be understood, based on this disclosure that other polyester films having similar biaxial orientation with or without adhesion promoting treatment on one or both surfaces of the polyester film are within the scope of the invention.

An undercoating 22 may be provided to the lower surface 28 of the polyester film 24 in the polyester layer 14 for providing a base color to the film 10. If an adhesion promoting treatment is present on the lower surface 28 of the polyester film 24, then the undercoating would be in contact with the adhesion promoting treatment 25 as shown in FIG. 4. The undercoating may be any suitable base color coating known to those of ordinary skill in the art and preferably includes coloring agents such as organic and inorganic pigments and dyes, one or more solvents and a resin such as an acrylic resin, a vinyl resin, a lacquer or mixtures thereof. During the curing, i.e., film drying, the organic solvent(s) are substantially removed by evaporation due to the application of heat from the undercoating layer 22 as well as from the various other solvent-based layers in the film 10. The lacquer is preferably a nitrocellulose lacquer or lacquer-based formulation.

The acrylic and/or vinyl resins may be any suitable acrylic or vinyl resin, either synthesized or commercially available as described in detail below with respect to the decorative base coat 20. It is preferred that the resin or lacquer in the base coat be capable of bonding to an adhesive 30 for bonding the film 10 to the substrate and optionally capable of cross-linking to provide a protective base for the film 10. It is further preferred that the lacquer or resin-containing undercoating 22 contribute to the structural integrity of the film 10 and adhere well to the polyester film 24 and/or the adhesion promoting treatment 25 on the film 24. Preferably, the undercoating 22 includes organic and/or inorganic pigments as coloring agents and a nitrocellulose lacquer in a solvent base. The nitrocellulose may be provided to the coating as a solid component or in a solvent base formulation.

The solvents which may be used in the undercoating, or throughout the various solvent-based formulations for the layers in the film 10 may be any organic solvent having compatibility with the resin or lacquer selected for the base coat, for example, acetone, diacetone alcohol, ethanol, toluol, toluene, xylene, butyl acetate, ethyl acetate, ethylbutyl acetate, methyl ethyl ketone, methyl isobutyl ketone, isopropanol, methylpyrrolidone, cyclohexanone, glycol ethers and the like, and mixtures and blends thereof. It is understood by one skilled in the art that the appropriate solvent(s) should be chosen with regard to its compatibility with those resins which are used in the formulations of the various layers of the film 10. Factors such as intended end use, type of polyester film 24, resin solubility, potential toxicity, and boiling point should be considered in choosing an appropriate solvent.

The coloring agents may be any commercial dye or organic or inorganic pigment having compatibility with the solvent base selected and which alone, or in combination, provides the desired color base. Exemplary coloring agents include phthalocyanine blue, diazo condensation pigments, titanium dioxide, various iron oxides, and similar pigments and/or dyes. Other additives may be provided to the undercoating, coating layers in the decorative layer 16 or protective layer 18 including dispersants, stabilizers, leveling agents, wetting agents, adhesion promoters, pigment stabilizers and dispersants. Such additives may be present throughout all layers of the film 10, and may comprise up to about 15% of the film 10 with the exception of the polyester layer 14 on a solids basis.

The solvent(s) should comprise from about 50% to about 80% by weight, and more preferably from about 60% to about 70% by weight of the undercoating formulation prior to drying. The resin or lacquer should be from about 30% to about 90% by weight, and preferably from about 40% to about 50% by weight of the undercoating, on a solids basis. The coloring agent(s) are preferably from about 10% to about 70% by weight, and preferably from about 50% to about 60% of the undercoating on a solids basis. The undercoating 22 may be omitted from the film 10 without departing from the present invention if a thinner film 10, or a lack of base color under the polyester film 24 in the polyester layer 14 is desired for a particular application.

The decorative layer 16 on the upper surface 26 of the polyester layer 14, preferably includes a decorative base coat 20 and one or more decorative print layers 32. FIGS. 2 and 3 show three such print layers 32*a*, 32*b*, 32*c*, however, it should be understood, based on this disclosure that the print layers 32 may be omitted if a solid color or a pattern is provided to the film 10 by use of the decorative base coat 20 and/or an undercoating 22. Alternatively, the decorative base coat 20 may be omitted if a color or pattern is provided to the film 10 by use of one or more print layers 32 and/or an undercoating 22. The print layers may be arranged so as to create a pattern or design, such as a wood grain look, and the print layers 32 may extend along the length of the film 10 as shown in FIGS. 2 and 3 or only partially across the film (not shown) to create a pattern or design. Further, individual print layers 32 may incorporate design layers or markings 34 to create certain patterns in the decorative layer 16 as shown, for example, in FIG. 3.

If used, the decorative base coat 20 can be made to improve interlayer adhesion and/or cross-linking between the polyester layer 14 and the remainder of the decorative layer 16 and to provide a further color to the decorative layer if desired. The decorative base coat preferably has one or more solvent(s), one or more reactive vinyl, acrylic and/or acetate-based resins, one or more coloring agents, a melamine or similar cross-linking resin, and an acid catalyst. The solvents may be any of the solvents mentioned above for the undercoating 22. The reactive vinyl, acrylic and/or acetate-based resins are preferably hydroxy-functionalized vinyl chloride or acrylate homopolymers, hydroxy-functionalized vinyl chloride/vinyl acetate copolymers or hydroxy-functionalized vinyl chloride/hydroxyalkyl acrylate/vinyl acetate terpolymer resins or mixtures, copolymers and blends of such polymers. Preferably, the hydroxyl functionality of the reactive vinyl, acrylic and/or acetate resins is about 2–2.5. Most preferably, the reactive vinyl, acrylic and/or acetate resin is a vinyl chloride/vinyl acetate copolymer and/or a terpolymer of vinyl chloride/vinyl acetate/hydroxyalkylacrylate. Preferably, the vinyl chloride content of the polymer or combination of polymers is from about 80% to about 90%. The cross-linking resin is preferably a urea and/or a melamine resin which may be any suitable reactive urea and/or melamine, but is preferably an alkylated melamine such as hexamethoxymethylmelamine. The acid catalyst may be any catalyst component, such as an aromatic sulfonic acid catalyst suitable for accelerating the cure of the cross-linking resin used in the decorative base coat 20. Such catalysts are known in the art for cross-linking with various thermosetting resins. The coloring agent may be any of those described above with respect to the undercoating 22.

The solvent(s) in the base coat 20 preferably are from about 40% to about 80% by weight, preferably from about 50% to about 60% by weight of the base coat. The reactive vinyl, acrylic and/or acetate-based resins are preferably from about 10% to 35% by weight, preferably from about 10% to about 20% of the base coat. The coloring agents preferably provide from 0% to about 45%, preferably from about 10% to about 30% by weight of the base coat, and the crosslinking resin provides from about 1% to about 20%, preferably from about 1% to about 10% by weight of the base coat. The catalyst should be present in an amount sufficient to cure the crosslinking resin in the base coat, preferably from about 0.20% to about 5% by weight, more preferably from about 0.5 to about 2% by weight of the base coat. Additives, such as those mentioned above, may be provided from 0% to about 2% of the base coat, but preferably from 0% to about 1%.

The print layer(s) 32 are preferably formed of a solvent-based coating(s) having one or more coloring agents or blends of coloring agents such as dyes and/or pigments and preferably one or more of the reactive vinyl, acrylic and/or acetate-based resins mentioned above with respect to the base coat. More preferably, a vinyl chloride/vinyl acetate copolymer having hydroxyl functionality is used in the print layer(s). However, it should be understood, based on this disclosure that other resins used in solvent-based print coatings which are known in the art may be used. Any of the solvents or pigments noted above may be used in the print layers 32. The print layers are preferably from about 30% to about 90% solvent(s), with the remainder being solid components. If used, the resin is preferably from about 10 to about 20% by weight of the print layer formulation. If markings 42 are provided within the print layer(s) or on the print layers, the markings may have a formulation having the same base as the print layers 32, and may also include gloss adjusting additives, such as flatting agents and the like for creating various high or low gloss optical effects on the surface of the decorative layer 16. Marking formulations such as those of U.S. Pat. No. 5,503,905 of Gregory Boris, incorporated herein by reference, may also be used.

An optional lacquer protective layer 18 is provided to the top of the various print layer(s) 32. The lacquer protective layer 18 can be used to protect the decorative layer 16 from scratches, impact damage and staining. The protective coating preferably comprises a solvent base, a reactive hydroxy-functional vinyl-based resin or hydroxy-functionalized acrylic-based resin, a reactive crosslinking resin, an acid catalyst and silicone. Alternatively, any suitable thermosetting and/or thermoplastic curable lacquer or UV-curable protective lacquer system may be used. However, it is presently preferred to use the reactive resins, catalyst and silicone as noted above. The solvents may be any of those mentioned above with respect to the undercoating. Other additives may also be provided such as those mentioned above, including defoamers, extenders for enhancing scratch resistance and additives such as flatting agents which may adjust the gloss level for different types of film surface appearances. The hydroxy-functional vinyl-based resin is preferably a hydroxy-functional vinyl chloride homopolymer or copolymer or terpolymer of vinyl chloride, vinyl acetate and/or hydroxyalkyl acrylate having a somewhat higher hydroxyl functionality than the vinyl resins used in the undercoating and/or base coating. Preferably, the reactive vinyl resin is a hydroxy-functionalized terpolymer of vinyl chloride/vinyl acetate/hydroxyalkyl acrylate having a hydroxyl functionality of about 3 and the vinyl chloride content of the terpolymer is preferably from about 60% to about 70%.

The reactive cross-linking resin and catalyst in the protective layer 18 may be any of those used in the decorative base coat 20 described above. The silicone component preferably has hydroxyl functionality and may be any suitable curable silicone polymer or blend or mixture of silicone polymers. Preferably, a silicone or silicone blend capable of reacting with and crosslinking with the crosslinking resin, e.g., a melamine resin, is used. Such silicones include hydroxy-functional polyester-modified dimethylpolysiloxanes and similar silicones.

Preferably, the solvent(s) make up from about 40% to about 70% of the protective layer 18, more preferably from about 50% to about 60% by weight of the layer 18. It is further preferred that the reactive vinyl resin be present in an amount of from about 10% to about 40%, more preferably from about 20% to about 30% of the layer 18. The silicone polymer is preferably present in minor amounts of from about 0.1% to about 2%, more preferably from about 0.1% to about 1% by weight of the layer 18. The crosslinking resin is preferably from about 1% to about 10%, more preferably from about 1% to about 5% by weight, and the catalyst is preferably from about 0.5 to about 5%, and more preferably from about 1% to about 3% of the layer 18. Additives such as defoamers, flatting agents and extenders are preferably provided in amounts of from 0% to about 10%, and more preferably from 2% to about 7% by weight of the protective layer 18.

It should be understood, based on this disclosure that other preferred formulations for the various layers of the decorative layer 16 and for the protective layer 18 may be used provided the formulations are compatible, and the base coat layer 20 adheres well to the polyester layer 14 to resist delamination.

The invention further includes a method for coating a three-dimensional substrate which includes adhering a decorative film, preferably the film 10 as described above, at least partially around a three-dimensional substrate. The substrate may be any of the substrates 12 suitable for use with the film 10 described above. The film 10 need not be wrapped completely around the substrate if only a portion of the substrate is to be decorated. The film 10 may be adhered to the substrate 12 using any suitable pressure-sensitive and/or heat sensitive adhesive, preferably a water-based glue or hot melt glue. The adhesive may be provided to the film 10 as an optional adhesive layer, if desired. However, the substrate may also be coated with an adhesive or the film coated with an adhesive prior to attachment to the substrate. Preferably, the substrate is coated with a water-based or hot melt glue adhesive 30 as shown in FIG. 2, which then contacts the lower most surface of the film 10, which is either the lower surface 28 of the polyester layer 14 or the undercoating 22, if an undercoating is used. The adhesive may be activated using a wrapping machine having a heat source or by pressure from the wrapping machine to press the glue against the surface. Such machines and wrapping equipment are known in the art and need not be described herein.

The invention will now be described in more detail with respect to the following specific, non-limiting examples:

EXAMPLE I

One surface of a Melinex® 454 a transparent biaxial polyethylene terephthalate film pretreated on both sides with an aqueous-based acrylic adhesion promoting treatment was coated by gravure roller with a decorative base coat having the composition below in Table 1.

TABLE 1

| Component | Weight Percentage (%) |
|---|---|
| Methyl Ethyl Ketone | 8.31 |
| Denatured Ethyl Alcohol Anhydrous | 8.23 |
| Toluol | 16.69 |
| Methyl Isobutyl Ketone | 13.75 |
| Butyl Acetate | 7.62 |
| Dispersant | 0.36 |

TABLE 1-continued

| Component | Weight Percentage (%) |
|---|---|
| Vinyl Chloride/Vinyl Acetate/ Hydroxyalkyl Acrylate Terpolymer Resin – OH number = 2.1; vinyl chloride content = 81.9 | 11.07 |
| Hydrolyzed Vinyl Chloride/Vinyl Acetate Resin OH number 2.3; vinyl chloride content 90.6 | 3.70 |
| Red Iron Oxide | 2.22 |
| Titanium Dioxide | 5.95 |
| Yellow Iron Oxide | 16.23 |
| Hexamethoxymethylmelamine | 4.79 |
| Aromatic Sulfonic Acid Catalyst - acid number (solution basis) 130–140 | 1.10 |

Three print coats having the formulation in Table 2 were printed on the base coat in varying patterns using rotogravure pattern rollers to create a wood grain design.

TABLE 2

| Component | Weight Percentage (%) |
|---|---|
| Carbon Black | 3.34 |
| Red Diazo Condensation Pigment | 1.66 |
| Yellow Diazo Condensation Pigment | 2.02 |
| Hydrolyzed Vinyl Chloride/Vinyl Acetate Resin OH number 2.3; vinyl chloride content 90.6 | 15.00 |
| Methyl Isobutyl Ketone | 77.98 |

On the surface of the print layers, a protective coating was applied by roller having the formulation noted below in Table 3.

TABLE 3

| Components | Weight Percentage (%) |
|---|---|
| Methyl Ethyl Ketone | 19.73 |
| Methyl Isobutyl Ketone | 19.73 |
| Toluol | 13.49 |
| Denatured Ethyl Alcohol Anhydrous | 7.00 |
| Clear Abrasion-Resistant Extender | 4.00 |
| Flatting Agent | 2.34 |
| Terpolymer of Vinyl Chloride/Vinyl Acetate/Hydroxyalkyl Acrylate – vinyl chloride content = 67%; OH functionality = 3 | 26.48 |
| Hydroxy Functional, Polyester-Modified Dimethylpolysiloxane | 0.79 |
| Defoamer | 0.51 |
| Hexamethoxymethylmelamine | 3.74 |
| Aromatic Sulfonic Acid Catalyst - acid number (solution basis) 130–140 | 2.19 |

The decorated film was then passed over a turning bar and an undercoating was then provided to the opposite surface of the polyethylene terephthalate film. The undercoating had the composition as shown below in Table 4 and was applied by use of a gravure roller.

TABLE 4

| Component | Percentage |
|---|---|
| Nitrocellulose Lacquer/Solvent Solution | 44.61 |
| Methyl Isobutyl Ketone | 37.65 |
| Titanium dioxide | 14.81 |
| Black Iron Oxide | 0.36 |

TABLE 4-continued

| Component | Percentage |
|---|---|
| Yellow Iron Oxide | 1.39 |
| Red Iron Oxide | 0.18 |

The film 10 of the present invention provide excellent flexibility for wrapping around and closely adhering to three-dimensional substrates. They are dimensionally stable and conform smoothly around the curved surfaces of the substrate to create a highly defect-free appearance. The films 10 are thermally stable during processing and the polyester base film resists shrinkage. By providing a protective layer, the films are stain-resistant and also scratch-resistant while being able to provide many varied designs to the surface of substrate without the need for polymer heat molding and without delamination.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A decorative wrapping film for application to a three-dimensional substrate, comprising:

(a) a biaxially oriented polyester layer having a first surface far adhering to a three-dimensional substrate and a second surface;

(b) a decorative layer coated on the second surface of the polyester layer and comprising at least one layer formed from a formulation comprising at least one solvent, and one or more reactive resins; and (c) a protective layer coated on the decorative layer, wherein the biaxially-oriented polyester layer, the decorative layer and the protective layer form a wrapping film capable of being adhered to a three-dimensional substrate by use of a wrapping apparatus after application of an adhesive to the first surface of the polyester layer or to a three-dimensional substrate such that the biaxially oriented polyester layer contacts and conforms to the three-dimensional substrate.

2. The decorative wrapping film according to claim 1, wherein the biaxially-oriented polyester layer comprises a polyalkylene terephthalate selected from the group consisting of a polybutylene terephthalate and a polyethylene terephthalate.

3. The decorative wrapping film according to claim 2, wherein the polyester layer has a thickness of from about 50 to about 700 gauge.

4. The decorative wrapping film according to claim 3, wherein the polyester layer has a thickness of from about 90 to about 200 gauge.

5. The decorative wrapping film according to claim 1, wherein the biaxially-oriented polyester layer comprises an adhesion promoting pretreatment on at least one of the first surface and the second surface.

6. The decorative wrapping film according to claim 5, wherein the polyester layer comprises a polyethylene terephthalate and the adhesion promoting pretreatment is an aqueous-based acrylic coating having a thickness of no greater than 1 micron and chemically cross-linked to the polyester layer.

7. The decorative wrapping film according to claim 1, wherein the decorative layer comprises a base coat applied to the second surface of the polyester layer and at least one print layer on the base coat.

8. The decorative wrapping film according to claim 1, wherein the first surface of the polyester layer is coated with a colored undercoating layer.

9. The decorative wrapping film according to claim 8, wherein the colored undercoating layer comprises a nitrocellulose lacquer and at least one coloring agent.

10. The decorative wrapping film according to claim 1, wherein the decorative layer comprises at least one layer formed from a formulation comprising a solvent, a reactive resin, and a coloring agent selected from the group consisting of organic pigments, inorganic pigments, and dyes.

11. A decorative wrapping film for application to a three-dimensional substrate, comprising:

(a) a biaxially oriented polyester layer having a first surface for adhering to a three-dimensional substrate and a second surface, wherein the biaxially-oriented polyester comprises a polyalkylene terephthalate selected from the group consisting of polybutylene terephthalate and a polyethylene terephthalate and the polyester layer has a thickness of from about 50 to about 700 gauge; and (b) a decorative layer coated on the second surface of the polyester layer, wherein the decorative layer comprises at least one layer formed from a formulation comprising at least one solvent, and one or more reactive resins, and wherein the biaxially-oriented polyester layer and the decorative layer form a wrapping film capable of being adhered to a three-dimensional substrate by use of a wrapping apparatus after application of an adhesive to the first surface of the polyester layer or to a three-dimensional substrate such that the biaxially oriented polyester layer contacts and conforms to the three-dimensional substrate.

12. The decorative wrapping film according to claim 11, wherein the film further comprises a protective layer coated on the decorative layer.

13. The decorative wrapping film according to claim 11, wherein the polyester layer has a thickness of from about 90 to about 200 gauge.

14. The decorative wrapping film according to claim 11, wherein the biaxially-oriented polyester layer comprises an adhesion promoting pretreatment on at least one of the first surface and the second surface.

15. The decorative wrapping film according to claim 13, wherein polyester layer comprises polyethylene terephthalate and the adhesion promoting pretreatment is an aqueous-based acrylic coating having a thickness of no greater than 1 micron.

16. The decorative wrapping film according to claim 11, wherein the decorative layer comprises at least one layer formed from a formulation comprising a solvent, a reactive resin, and a coloring agent selected from the group consisting of organic pigments, inorganic pigments, and dyes.

* * * * *